Oct. 3, 1967
W. E. N. DOTY
3,345,504
APPARATUS FOR DETERMINING THE DEGREE OF
COHERENCE BETWEEN TWO SIGNALS
Filed April 29, 1963
2 Sheets-Sheet 1
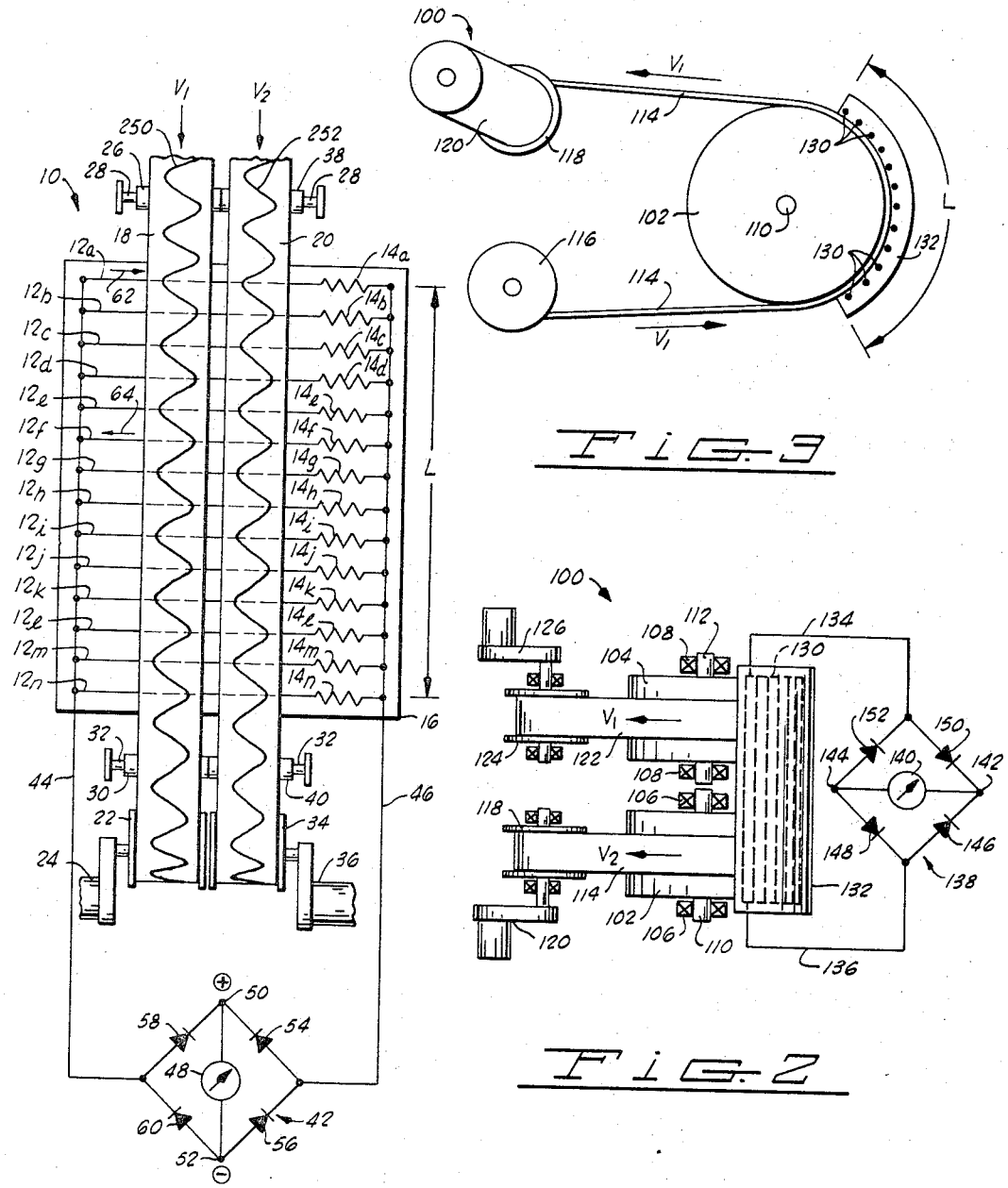
INVENTOR.
WILLIAM E. N. DOTY
BY
ATTORNEY

INVENTOR.
WILLIAM E. N. DOTY
BY
ATTORNEY

United States Patent Office 3,345,504
Patented Oct. 3, 1967

3,345,504
APPARATUS FOR DETERMINING THE DEGREE OF COHERENCE BETWEEN TWO SIGNALS
William E. N. Doty, Needham Heights, Mass., assignor to Continental Oil Company, Ponca City, Okla., a corporation of Delaware
Filed Apr. 29, 1963, Ser. No. 276,398
13 Claims. (Cl. 235—181)

The present invention relates to signal analysis and more particularly, but not by way of limitation, relates to a novel method and apparatus for determining the degree of coherence between first and second signals magnetically recorded on first and second record tracks.

The determination of the degree of coherence between two signals pertains to many fields. For the purposes of the present invention, the instantaneous degree of coherence between finite time intervals of two signals may be defined as the integral of the algebraic sum of the corresponding instantaneous values of the two signals taken over the finite time intervals. However, the measurement of the degree of coherence becomes more useful if the finite time periods are translated over the length of one or both of the signals in various ways to produce what may be termed as correlation studies. For example, when using the method of seismographic surveying described in its various aspects in U.S. Patents Nos. 2,688,124, 2,808,577, 2,981,928 and 2,989,726, each of which is assigned to the assignee of the present invention, a prolonged seismic sweep signal having a predetermined frequency content is induced in the earth. The seismic sweep signal propagates downwardly to the various subsurface interfaces and a portion of the seismic energy is reflected back to the surface as the energy passes through each interface. The entire time duration of the sweep signal is reflected by each interface and since the sweep signal is of longer duration than the travel times between the various interfaces, the sweep signals will overlap in time to produce a very complex seismic signal which is detected and recorded at the surface. The complex signal does not immediately produce any useable data because the arrival times of the overlapping sweep signals cannot readily be ascertained. However, by determining the degree of coherence between the original sweep signal and each time period of corresponding length of the complex signal and recording the coherence value with respect to the time scale of the complex signal, a correlation trace representative of the degree of coherence between the two signals with respect to the time scale of the complex signal will be produced which will clearly and accurately indicate the precise arrival times of the various reflections of the sweep signals at the surface.

In accordance with the present invention, the degree of coherence between two signals magnetically recorded on elongated record tracks is determined by moving at least one conductor segment longitudinally along the first magnetic track, simultaneously moving a corresponding number of second electrical conductor segments along the second record track in synchronism with movement of the first electrical conductor segment, algebraically adding the EMF's generated in the corresponding first and second electrical conductor segments at each point in time, and integrating the algebraic sums over finite lengths of the two record tracks to produce a value representative of the degree of coherence between the two signals for that time period. The integration of the algebraic sum of the instantaneous values can be approximated with considerable precision by using a plurality of conductor segment pairs to simultaneously sample the instantaneous algebraic sums over a finite length of the record track and then adding the absolute values of the net electromotive forces generated in the several conductor segment pairs to produce the integrated value which is indicative of the degree of coherence. Or circuitry can be provided for electronically integrating the algebraic sum signal from a single pair of conductor segments as the conductor segments are moved in synchronism at a high rate over the finite time periods of the record tracks.

Therefore it is an important object of the present invention to provide a method and apparatus for determining the degree of coherence between a pair of signals.

Another object of the present invention is to provide a method and apparatus for determining the degree of coherence between first and second signals directly from the magnetic tapes on which the signals are magnetically recorded.

Still another object of the present invention is to provide a method and apparatus of the type described wherein the degree of coherence of two signals can be determined with respect to substantially any time relationship.

A still further object of the present invention is to provide apparatus for determining the degree of coherence between two signals that is relatively simple in construction and which may therefore be economically constructed, easily and economically operated, and which will have a relatively long service life.

Many additional objects and advantages of the present invention will be evident to those skilled in the art from the following detailed description and drawings, wherein:

FIG. 1 is a somewhat schematic plan view of a device constructed in accordance with the present invention which may be utilized to practice the method of the present invention;

FIG. 2 is a somewhat plan view of another device constructed in accordance with the present invention which may also be used to practice the method of the present invention;

FIG. 3 is a somewhat schematic side elevation of the device illustrated in FIG. 2;

Figure 6:
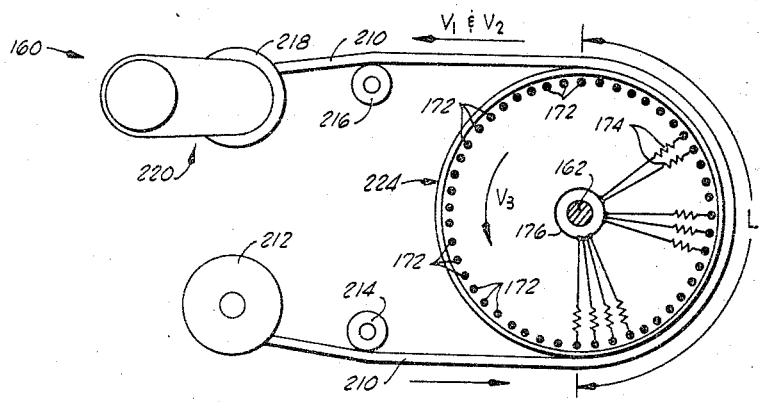
FIG. 6 is a sectional view taken substantially on lines 6—6 of FIG. 4.

Referring now to the drawings, and in particular to FIG. 1, a device constructed in accordance with the present invention is indicated generally by the reference numeral 10. The device 10 comprises a plurality of electrical conductors designated sequentially by the reference numerals 12a–12n which are disposed in uniformly spaced, parallel relationship and which, as illustrated, lie in a planar surface. Each of the conductors 12a–12n includes a resistor so as to substantially prevent interaction between the EMF's generated in the several conductors, as hereafter described in greater detail, the resistors being designated by the reference numerals 14a–14n, respectively. The conductors, hereafter designated collectively by the reference numeral 12, may be supported by a suitable base 16 which may be fabricated from any suitable nonconductive material which will not interfere with magnetic lines of flux. The conductors 12 may conveniently be imbedded at uniform depths within the support means 16 so that the surface of the support means 16 may be made very smooth for supporting first and second magnetic tracks 18 and 20 in predetermined, constant relationship to all of the conductors 12 as the magnetic tracks are moved relative to the conductors 12, as will presently be described.

The first magnetic track 18 is moved with a velocity $V_1$ across the conductors 12 by a takeup spool 22 which is driven by a motor and gear box assembly 24. The record track 18, which may be a conventional magnetic tape, may be withdrawn from a suitable storage spool (not illustrated) and may be properly oriented with respect to the upper surface of the support means 16 by a roller 26 which is journaled on a support shaft 28, and by a similar roller 30 which is journaled on a support shaft 32. The second magnetic record track 20, which may also be a conventional magnetic tape, is moved at a velocity $V_2$ across the conductors 12 in a parallel, side-by-side relationship to the track 18 by a takeup reel 34 which is driven by a suitable motor and gear box assembly 36. The second record track 20 may also be taken from a suitable storage spool (not illustrated) and passed over an aligning support roller 38, which may also be journaled on the support shaft, 28, prior to passing over the upper support surface of the conductor support means 16. A second alignment support roller 40 may be journaled on the support shaft 32 to insure that the record track leaves the support means 16 at the proper angle prior to being wound on the takeup reel 34. It will be appreciated that in practice the face of the magnetic tapes upon which the record tracks are disposed will face downwardly toward the conductors 12 so that the magnetic fields of the magnetic record tracks will be cut by the conductors 12 as the record tracks are moved relative to the several conductors, and will generate an EMF in each of the conductors, as will presently be described.

One end of each of the electrical conductors 12 is connected to an integrating circuit means, indicated generally by the reference numeral 42, by any suitable means such as a conductor 44. As previously mentioned, the other ends of the conductors 12 are connected to the resistors, hereafter indicated collectively by the reference numeral 14, and the other ends of each of the resistors 14 are connected to the integrating circuit means 42 by a suitable conductor 46.

The integrating circuit means 42 may comprise any suitable circuit means for summing the absolute values of the net EMF's generated in each of the conductor segments $12a$–$12n$. Such a circuit may comprise a conventional diode rectifier bridge and a visual indicating device such as a recorder 48 having a positive terminal 50 and a negative terminal 52. The indicating means 48 is preferably a recorder having a recording media which is moved in synchronism with movement of at least one of the record tracks 18 and 20 so that a trace will be produced which can be oriented with respect to the time scale of one of the record tracks. A diode 54 connects the conductor 46 to the positive terminal 50 and a diode 56 connects the conductor 46 to the negative terminal 52. A diode 58 connects the conductor 44 to the positive terminal 50 and a diode 60 connects the conductor 44 to the negative terminal 52. Then, assume for the moment that the net EMF generated in the conductor $12a$ is of such a polarity as to cause a conventional current to flow from positive to negative in the direction of the arrow 62. This current would then pass through the resistor $14a$, the conductor 46, the diode 54 to the positive terminal 50, through the indicating means 48 to the negative terminal 52 and through the diode 60 and the conductor 44 back to the other end of the conductor $12a$. The resistors 14 of the other conductors 12 should have a sufficiently large impedance with respect to the integrating circuit as to insure that no appreciable current will by-pass the integrating circuit. At the same time, presume that the EMF generated in the conductor $12f$ is of such a polarity as to cause a conventional current in the direction of the arrow 64. Then the conventional current would pass through the conductor 44 and diode 58 to the positive terminal 50, then through the recorder 48 to the negative terminal 52, through the diode 56, the conductor 46 and the resistor $14f$ back to the conductor $12f$. Thus it will be evident that regardless of the polarity of the net EMF generated in each of the conductors $12a$–$12n$, the rectifier bridge will always apply the voltage from each conductor to the indicating means 48 in the same direction such that the total of the absolute values of all the EMF's generated will be displayed by the indicating means 48.

Referring now to FIGS. 2 and 3, another device constructed in accordance with the present invention is indicated generally by the reference numeral 100. The device 100 is comprised of first and second magnetic tape support drums 102 and 104 which may be journaled by bearing supports 106 and 108, respectively, for rotation about aligned axles 110 and 112. A first magnetic tape 114 may be withdrawn from a storage spool 116 and passed around the support drum 102 to a takeup spool 118 which may be driven by a suitable drive means 120. A second magnetic tape 122 may be withdrawn from a storage spool (not illustrated) and passed around the support drum 104 to a takeup spool 124 which may be driven by any suitable drive means 126. The speeds of the drive means 120 and 126 are preferably infinitely variable within the physical design limits of the units so that the first tape 114 can be moved at any desired linear velocity $V_1$, and the second tape 122 can be moved at any desired linear velocity $V_2$. Thus it will be evident that if the velocities $V_1$ and $V_2$ are different, a relative longitudinal motion will be established between the first and second tapes 114 and 122.

A plurality of conductors 130 are disposed generally parallel to the support axles 110 and 112 of the drums 102 and 104, respectively, and are circumferentially spaced around the periphery of the drums over an arcuate length L. The conductors 130 extend transversely across both of the magnetic tapes 114 and 122, as can be seen by the dotted outlines in FIG. 2. The conductors 130 may be supported by any suitable support means, represented by the reference numeral 132, but are held in fixed, equally spaced relationship from the surface of the tapes 114 and 122 so that the magnetic fields of the tapes will extend outwardly to and be cut by the conductors 130 as the tapes are rotated to generate EMF's in each of the conductors in the manner hereafter described in greater detail. As in the case of the conductors $12a$–$12n$, the conductors 130 include suitable resistors (not illustrated) and the opposite ends of the conductors are all connected by suitable conductors 134 and 136 to an integrating circuit means indicated generally by the reference numeral 138 which is identical to the integrating circuit means 42. The integrating circuit means 138 also has an indicating means 140, preferably a recorder, having positive and negative poles 142 and 144, respectively which are connected in a rectifier bridge comprised of diodes 146, 148, 150 and 152 which are connected as illustrated.

Figure 5:
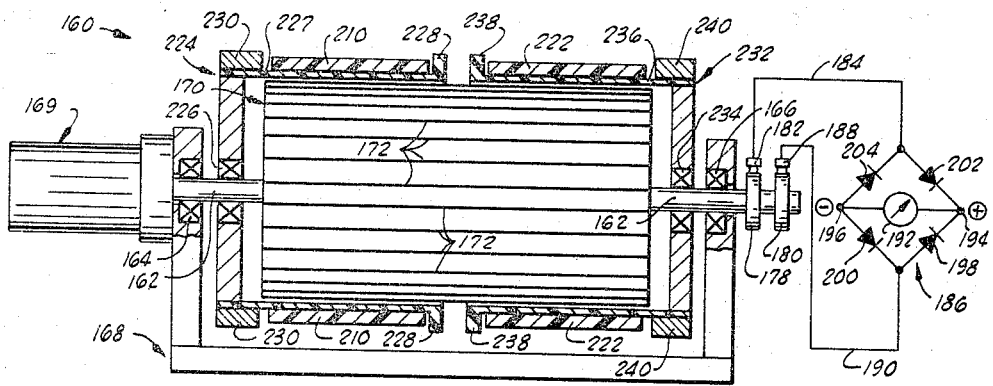
FIG. 5 is a sectional view taken substantially on lines 5—5 of FIG. 4.
Figure 4:
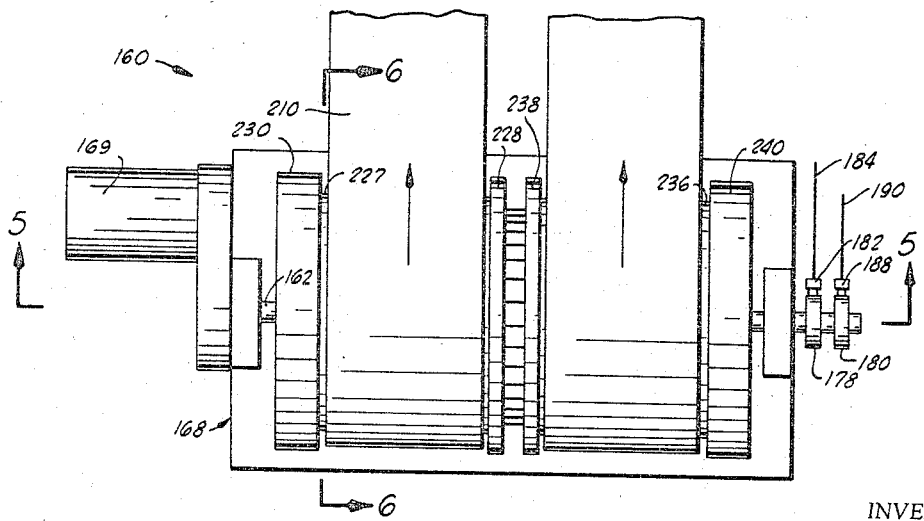
FIG. 4 is a somewhat schematic plan view of still another device constructed in accordance with the present invention which can be used to practice the present invention.

Referring now to FIGS. 4, 5 and 6, a third device constructed in accordance with the present invention is indicated generally by the reference numeral 160. As can best be seen in FIG. 5, a shaft 162 is journaled in support bearings 164 and 166 located in the upright members of a suitable support means 168. A suitable drive means 169, such as an electric motor and gear box, is connected to rotate the shaft 162 at a preselected, constant speed. A cylindrical drum 170 is connected to the shaft 162 and is rotated by the shaft. A plurality of conductors 172 are circumferentially spaced around the cylindrical surface of the drum 170 and extend generally parallel to the shaft 162. The conductors 172 correspond to the conductors $12a$–$12n$ of the device 10 and to the conductors 130 of the device 100, and accordingly each is provided with a resistor 174 and is connected to a common conductor ring 176, as best seen in FIG. 6. With reference to FIG. 6, it is to be understood that all of the conductor 172 are connected to the conductor ring 176, although as illustrated only a portion of the conductors 172 are so connected. The other ends of the conductors 172 may also be connected to a common conductor ring (not illustrated) and the two conductor rings may be individually connected by conductors (not illustrated) passing through the hollow shaft 162 to slip rings 178 and 180 mounted on the end of the shaft 162, as illustrated in FIGS. 4 and 5. A brush 182 and conductor 184 connects the slip ring 178 to one side of an integrating circuit means, indicated generally by the reference numeral 186, which is identical to the integrating circuit means 42 and 138 previously described. The other slip ring 180 is connected by a brush 188 and conductor 190 to the other side of the integrating circuit means 186. The integrating circuit means 186 comprises a suitable indicating means, such as a recorder, having positive and negative terminals 194 and 196, respectively, and a rectifier bridge comprised of diodes 198, 200, 202 and 204.

A first magnetic tape 210 is taken from a storage spool 212 and passed over an alignment roller 214, around the drum 170, and over a second alignment roller 216 to a takeup spool 218 which may be driven by any suitable drive means 220, such as a variable speed electric motor and gear train. Thus the tape 210 can be moved at a linear velocity $V_1$ which is preferably any velocity between zero and the maximum designed velocity of the drive means 220. A second magnetic tape 222 may be moved around the drum 170 in substantially the same manner as the magnetic tape 210, but at a second velocity $V_2$ by apparatus substantially identical to that previously described including storage and takeup reels, guide rollers and a suitable drive means, none of which is illustrated.

As will hereafter be described in greater detail, the drum 170 is rotated at a relatively high velocity $V_3$ relative to the support 168. Although the conductors 172 can be imbedded in an electrically nonconductive material and the surface of the drum finished smooth so that the magnetic tapes 210 and 222 can slide on the surface of the drum, in most cases this would result in considerable wear both to the surface of the drum 170 and to the magnetic tapes 210 and 222. Therefore, a magnetic tape support drum 224 is journaled by bearings 226 on the shaft 162 for holding the first tape 210 in spaced relation to the surface of the drum 170. The drum 224 is comprised of a relatively thin cylindrical portion 227 having an annular shoulder 228 to stiffen the thin cylindrical portion and also serve as a guide for the tape 210. The cylindrical portion 227 should be fabricated from a nonconductive plastic material which will freely pass the magnetic lines of flux from the tape 210 to the conductors 172. An annular ring 230 may be used to hold the cylindrical portion 227 in place on a disc 231 and also serve as a guide shoulder for the tape 210. The second tape 222 may pass over a substantially identical support roller 232 which may also be journaled on the drive shaft 162 by a bearing 234. The support roller 232 also has a cylindrical portion 236 and inner and outer shoulders 238 and 240, respectively. Thus it will be evident that the support rollers 224 and 232 are both free to rotate on the shaft 162 and independently of the drum 170 at a speed dictated by the velocities $V_1$ and $V_2$ of the tapes 210 and 222. Further, it will be evident that the tapes 210 and 222 will be accurately maintained at a predetermined distance from the conductors 172 and yet will not be subjected to any abrasive wear.

In the operation of the device 10, the first magnetic tape 18 is moved across the electrical conductors 12a–12n at a velocity $V_1$ and will be wound onto the takeup spool 22. The magnetic field of the magnetic record track thereon will pass through the several conductors 12 and will generate an EMF in each of the conductors 12a–12n, as will presently be described. At the same time, the second magnetic tape 20 will be moved across the conductors 12a–12n at a velocity $V_2$ and will be wound onto the takeup spool 34. Of course the magnetic fields of the magnetic record track of the tape 20 will pass through the conductors 12a–12n and will also generate EMF's in each of the conductors 12a–12n.

Although it is to be expressly understood that each of the signals magnetically recorded on the magnetic tapes 18 and 20 may be of any frequency, for purpose of illustration the two signals will be considered as two sine waves of the same constant frequency. Also, assume for the moment that the velocities $V_1$ and $V_2$ are equal so that there is no relative motion between the two tapes 18 and 20, although it is to be understood that the velocities may be of substantially any relative magnitude. Assume further that the signal magnetically recorded on the tape 18 can be represented by the graph 250 and the signal magnetically recorded on the tape 20 can be represented by the graph 252. It will be noted that as illustrated in FIG. 1, the two signals are in phase alignment such that the magnetic flux over each of the successive conductors 12a–12n is of the same polarity and of maximum magnitude.

With the foregoing assumption, it will be evident that the polarities of the EMF's generated in the segments of each conductor 12 (shown in dotted line) that are within the magnetic fields of the respective magnetic tapes will be in the same direction and will be cumulative. Further, if the left-hand end of the conductor 12a is positive, for example, the left-hand end of the conductor 12b will be negative, the left-hand end of the conductor 12c will be positive, the left-hand end of the conductor 12d will be negative, and the polarities of each successive conductor will reverse. It will also be evident that the magnitude of the EMF generated in each of the conductors will be at a maximum value since the intensity of the magnetic flux overlying each of the conductors is at a maximum. Conventional current will then flow through the conductors 12a, 12c, 12e, 12g etc., from left to right through the respective resistors 14, through the conductor 46, the diode 54, the indicating means 48, the diode 60, and through the conductor 44 back to the original electrical conductor 12. In the same manner, conventional current will pass through the electrical conductors 12b, 12d, 12f and the other conductors whose left-hand ends are negative, from right to left through the conductor 44, the diode 58, the indicating means 48, the diode 56, the conductor 46 and the respective resistor 14 back to the original conductor 12. Therefore it will be noted that the EMF's in all of the conductors 12a–12n will be additively applied across the terminals 50 and 52 of the indicating means 48 such that the indicating means 48 will have a value representative of the total of the absolute values of the EMF's generated in the electrical conductors 12a–12n. This total will then be a valid approximation of the value of the integral of the algebraic sums of the corresponding instantaneous values of the two signals taken over the finite time interval represented by the length L on each of the two tapes.

Now assume that one of the tapes 18 or 20 is shifted until the two signals recorded on the tapes and represented by the traces 250 and 252, respectively, are 180 degrees out-of-phase. It would then be evident that the polarities of the magnetic flux from the magnetic record tracks positioned over the dotted segments of each of the individual conductors 12a–12n would be substantially equal and opposite, and would generate equal and opposite EMF's in the dotted portion of each of the conductors 12a–12n. The equal and opposite EMF's in each conductor 12 would then cancel such that no current would flow through the indicating means 48.

Assume now that the tape 18, for example, is maintained in the position illustrated and the tape 20 is shifted such that the signal represented by the trace 252 is 90 degrees out-of-phase with the signal represented by the trace 250. Then it will be evident that the magnetic flux of the tape 20 overlying each of the conductors 12a–12n will be neither positive or negative, but will be zero. In such a case only the magnetic flux from the tape 18 will generate EMF's in the conductors 12a–12n. The EMF generated in each conductor 12 is of the same polarity as in the case where the two signals are precisely in phase, but in each instance will have only one-half the magnitude. Therefore when the integrating circuit means 42 adds the absolute values of the EMF's generated in all of the conductors 12a–12n, the sum total as indicated by the indicating means 48 will be approximately one-half the maximum indication at precise phase alignment of the two signals.

From the foregoing discussion, it will be evident that the device 10 performs a simulated integration of the algebraic sum of the corresponding instantaneous values of the two signals recorded on the tapes 18 and 20 over the length L, and therefore is a measure of the degree of coherence between the two time periods of the signals represented by the length L. Of course it will also be appreciated that if the indicating means 48 is a recorder for recording the instantaneous value of the degree of coherence on a record media moved in synchronism with one of the tapes, then a correlation trace will be produced which will indicate the correlation between the two signals over the particular time relationship determined by the relative velocities of the two tapes. The tapes 18 and 20 can be moved at the same velocity so that the degree of coherence between an infinite number of time integrals L over the entire length of the tapes can be determined. Or, the tapes 18 and 20 can be moved at different velocities $V_1$ and $V_2$ so as to produce any desired relative motion and corresponding correlation study. It will also be noted that the primary concern in this instance is merely that each of the conductors 12a–12n be moved relative to the tapes 18 and 20 so that each will generate the necessary EMF in the respective conductors 12.

The device 100 of FIGS. 2 and 3 functions in an identical manner to the device 10 just described. The magnetic tapes 114 and 122 are passed in close proximity to the conductors 130 at velocities $V_1$ and $V_2$. An EMF is then generated in each of the conductors 130 in the same manner as the EMF's are generated in the conductors 12a–12n of the device 10. The EMF's generated in each of the conductors 130 by the tapes 114 and 122 will then be algebraically added and the absolute values of the algebraic sums generated in the several conductors will be added by the integrating circuit means 138, as previously described in connection with the integrating circuit means 42. Thus it will be noted that while the device 100 is somewhat more complicated and will be more difficult to construct, the tapes 114 and 122 are not subject to any abrasive wear by reason of the support drums 102 and 104, whereas the tapes 18 and 20 of the device 10 are required to slide over the upper surface of the support means 16 for the conductors 12. However, it will be evident that the conductors 12 of the device 10 could be positioned above the tapes 18 and 20 but then a problem of accurately maintaining the necessary spacing between the tapes and the several conductors 12a–12n would arise.

Although the principle of operation of the device 160 is substantially the same as that of the devices 10 and 100 previously described, the device 160 is different in that the plurality of electrical conductors 172 are rotated at a relatively high rate by the drive means 169 which drives the shaft 162 and the drum 170. The tape 210 is withdrawn from the storage spool 212 and passed over the alignment roller 214 which insures that the tape 210 contacts the support drum 224 at the proper tangential point so as to preserve the length L which is scanned by the conductors 172 as will presently be described. The tape 210 continues around the support drum 224, which accurately maintains a uniform spacing between the tape and the conductors 172, and passes over the alignment roller 216 which insures that the tape 210 leaves the support drum 224 at the precise point to accurately establish the other end of the length L. The drive means 220 drives the takeup spool 218 so that the tape 210 can be moved at any desired velocity $V_1$. The second magnetic tape 222 is moved around the support roller 232 in exactly the same manner at any selected velocity $V_2$.

The device 160 differs from the devices 10 and 100 previously described primarily in that the velocities $V_1$ and $V_2$ of the tapes 210 and 222 can be zero, because the velocity $V_3$ of the conductors 172 disposed on the periphery of the drum 170 will provide the necessary relative motion between the conductors and the magnetic fields of the magnetic tracks on the tapes 210 and 222 to generate the necessary EMF's in the conductors 172. Thus either one or both of the tapes 210 and 222 can be held stationary or can be moved at any velocity so as to produce a relative motion between the two tapes although in most cases the velocities $V_1$ and $V_2$ of the tapes will be constant, the velocities may be varied in any preprogrammed manner in order to attain the desired correlation studies with respect to time. Regardless of the motion of the tapes 210 and 222, at any point in time an EMF will be generated in the portion of each of the conductors 172 that is positioned adjacent to the magnetic tape 210 which will be proportional in magnitude and will have a polarity corresponding to that portion of the magnetic field of the tape 210 which is adjacent to the respective conductor 172. At the same time, an EMF will be generated in each of the conductors 172 which will have a magnitude and polarity corresponding to the amplitude and polarity of the magnetic field of the tape 222 through which the respective conductor is at that instant passing. The two EMF's generated in each of the conductors 172 will then instantaneously be algebraically added.

The algebraic sums of the EMF's generated in all of the conductors 172 will then be transmitted through the conductor ring 176 at one end of the drum 170 and the conductor ring (not illustrated) at the other end of the drum, and will be passed through the slip rings 178 and 180 and through the conductors 184 and 190 to the opposite sides of the integrating circuit means 186, which will add the absolute values of the EMF's as previously described in connection with the devices 10 and 100. Of course if the tapes 210 and 222 are both held stationary, the signal applied to the indicating means 192 will be constant and will indicate the degree of coherence between those two portions of the signals recorded on the tapes 210 and 222 over the length L. Even when the tapes 210 and 222 are moving, as will presently be described, the velocities $V_1$ and $V_2$ of the tapes will normally be very slow in comparison to the velocity $V_3$ of the conductors 172 and any differences in velocity between the tapes and the conductors 172 which arise due to relative motion between the tapes can be neglected insofar as the generation of the EMF's is concerned. However, as the two magnetic tapes are moved relative to a fixed point, such as the alignment roller 214, for example, the degree of coherence between the two signals taken over the length L will vary with respect to movement of the tapes and the varying value can be recorded with respect to the movement of either of the tapes to produce a correlation trace. By using various tape velocities $V_1$ and $V_2$, a wide variety of correlation studies can be made with respect to a wide variety of time relationships between the two signals recorded on the tapes 210 and 222.

The device 160 can also be used to correlate the original seismic sweep signal which is induced in the earth with the complex seismographic signal which is recorded as the composite of the reflections of the seismic sweep signal from the various subterranean interfaces. In this situation, the seismic sweep signal would be recorded on one of the tapes, such as the tape 222, over a length of the tape no greater than the length L. This portion of the tape 222 would then be positioned adjacent to the circumferential length L of the drum 170 and the tape held stationary. The other tape 210 would then be moved around the drum 170 from the beginning of the complex seismic signal to the end and the output from the indicating means 192 recorded in synchronism with the movement of the tape 210. Then each time that the seismic sweep signal on the stationary tape 222 has maximum coherence with a corresponding time length L of the complex signal on the tape 210, a maximum indication will be recorded by the indicating means 192. This maximum indication will be an accurate measure of the precise arrival time of the seismic sweep signal at the surface and is known in the art as a "seismic event." Thus it will be noted that although the device 160 is somewhat more complicated than either of the devices 10 or 100, it is also capable of performing some correlation time studies that are not possible when using the device 10 or 100.

The number of conductors 12, 130 or 172 which must be used in any particular device can vary over a relatively wide range. In order to have the maximum sensitivity to short wave length signals, a large number of conductors should be used so that a maximum number of instantaneous samples can be taken over the length L. By taking a maximum number of algebraic sum samples over the length L, the time constant of the particular integrating circuit can be kept at a minimum so as to obtain maximum sensitivity. However, as the relative speed between the conductors and the magnetic tape increases, the number of conductors can be decreased without increasing the time constant of the particular integrating circuit. For example, if a single conductor 172 is utilized in the device 160 and is rotated at a sufficiently high speed to scan the entire length L during the time constant period of the integrating circuit means 186, the resulting signal will be proportional to the degree of coherence between that portion of the signals on the two tapes 210 and 222 over the length L. The time constant of the integrating circuit means 186 can of course be increased by the use of a capacitor connected in shunt around the indicating means 192, for example. However, as the time constant of the integrating circuit means 186 is increased, the sensitivity of the device to the shorter wave lengths will be proportionately decreased. A single conductor could also be used when the conductors are held stationary as in the case of the devices 10 and 100, in which case the length L over which the integration would be taken would correspond to the distance the corresponding tapes moved during the time constant period of the integrating circuit.

The method in accordance with the present invention entails the synchronous movement of at least one pair of conductor segments relative to the magnetic force fields of two separate magnetic record tracks so as to generate EMF's in each of the conductor segments proportional to the intensity and in a direction according to the polarity of that particular portion of the respective magnetic fields such that each of the EMF's will be representative of the value of the signals recorded by the respective tracks. This pair of conductor segments would comprise, for example, that portion of one of the conductors 12, 130 or 172 which is disposed adjacent to the respective magnetic tapes 18 or 20, 114 or 112, or 210 or 222, such as those portions of the conductor 12a shown in dotted outline in FIG. 1. The conductor segments are moved relative to the respective tapes either by moving the tapes relative to a fixed point, as in the devices 10 and 100, by holding either or both of the tapes stationary and moving the conductor segments relative to a fixed point, as in the device 160, or if desired by moving both the magnetic tapes and the conductors 172 relative to a fixed point, as also described in the operation of the device 160. The next step of the method entails the algebraic summation of the EMF's generated in each pair of conductor segments. This can be very easily accomplished merely by connecting the conductor segments together in the form of a single conductor as in the case of each of the devices 10, 100 and 160. Next the absolute value of the algebraic sums of the EMF's generated in the conductor segments over a predetermined time period or length of the magnetic tracks are integrated. This integration can be accomplished in the case of a single or a small number of pairs of conductor segments by enlarging the time constant of the integrating circuit, but preferably is accomplished by using a relatively large number of pairs of conductor segments so as to simultaneously densely sample the corresponding values of the two signals over the desired time period to produce an instantaneous approximation of the degree of coherence between the two signals for that time period. The method of the present invention also contemplates relative movement between the two magnetic tracks at the same time that the conductors are moved relative to both of the magnetic tracks so that various correlation studies can be made as to the degree of coherence between the two signals with respect to various time relationships. This can be accomplished by moving both tapes relative to the conductors at different velocities to produce both the necessary motion between the conductors and the tapes and the relative motion between the two tapes, in which case the conductors can be held stationary or can be moved relative to a fixed point, or one of the tapes may be held stationary and the other moved, in which case it will be necessary to move the conductors relative to the stationary tape.

From the foregoing description it will be evident that a highly novel method and apparatus for determining the degree of coherence between two signals magnetically recorded on elongated record tracks has been described. Although several preferred embodiments of the present invention have been described in detail, it is to be understood that various changes, substitutions and alterations can be made therein without departing from the spirit and scope of the invention as defined by the appended claims.

What is claimed is:

1. A device for determining the degree of coherence between first and second signals magnetically recorded on first and second magnetic record tracks, the device comprising:

means for positioning the first and second record tracks in side-by-side relationship;

at least one electrical conductor extending transversely across both of the record tracks and intersecting the magnetic fields thereof:

means for moving both record tracks relative to the electrical conductors to generate an electromotive force in each of the conductors proportional to the algebraic sum of that portion of the magnetic fields of the respective record tracks through which the conductor is passing; and, circuit means operatively connected to the electrical conductors for producing an electrical signal proportional to the sum of the absolute values of the electromotive forces generated in the conductors while collectively traversing finite lengths of the first and second record tracks corresponding to finite time periods of the first and second signals, whereby the electrical signal will be representative of the degree of coherence between the finite time periods of the first and second signals collectively traversed by the conductors.

2. A device for determining the degree of coherence between first and second signals magnetically recorded on first and second magnetic record tracks as defined in claim 1 wherein:

there are a plurality of electrical conductors disposed in spaced, generally parallel relationship.

3. A device for determining the degree of coherence between first and second signals magnetically recorded on first and second magnetic record tracks as defined in claim 1 wherein:

the means for moving the record tracks relative to the electrical conductors moves the record tracks at different speeds relative to the conductors to produce relative movement between the two tracks, whereby the degree of coherence between the two signals with respect to various time relations can be determined.

4. A device for determining the degree of coherence between first and second signals magnetically recorded on first and second magnetic record tracks as defined in claim 1 wherein:

the conductors are held stationary and relative motion between the conductors and the record tracks is produced by moving the record tracks.

5. A device for determining the degree of coherence between first and second signals magnetically recorded on first and second magnetic record tracks as defined in claim 1 wherein:

the means for moving both record tracks relative to the electrical conductors moves the conductors relative to a fixed point and therefore relative to the record tracks.

6. A device for determining the degree of coherence between first and second signals magnetically recorded on first and second magnetic record tracks as defined in claim 1 wherein:

the means for moving both record tracks relative to the electrical conductors comprises means for moving the conductors relative to a fixed point and relative to the record tracks, and means for moving at least one of the record tracks relative to the fixed point and relative to the other record track.

7. A device for determining the degree of coherence between first and second signals magnetically recorded on first and second magnetic record tracks as defined in claim 1 wherein:

the means for moving both record tracks relative to the electrical conductors comprises means for moving the conductors relative to a fixed point and relative to the record tracks, means for moving the first record track relative to the fixed point at a first velocity, and means for moving the second record track relative to the fixed point at a second velocity.

8. A device for determining the degree of coherence between first and second signals magnetically recorded on first and second magnetic record tracks, the device comprising:

a plurality of electrical conductors lying in spaced, generally parallel relationship;

support means for positioning the first and second record tracks transversally to the conductors and spaced from each of the conductors with the magnetic fields of the record tracks intersecting the electrical conductors;

means for moving the first record track relative to the conductors to generate an electromotive force in each of the conductors proportional to the strength of the magnetic field intersecting the respective conductor;

means for moving the second record track relative to the conductors to generate an electromotive force in each of the conductors proportional to the strength of the magnetic field intersecting the respective conductor whereby the electromotive forces generated in each conductor as a result of the magnetic fields of the two record tracks will be algebraically added; and, circuit means for adding the absolute values of the electromotive forces generated in all of the electrical conductors to produce a correlation signal representative of the degree of coherence between two finite time periods of the first and second signals.

9. A device for determining the degree of coherence between first and second signals magnetically recorded on first and second magnetic record tracks as defined in claim 8 wherein:

the support means for positioning the first and second record tracks are generally cylindrical for positioning the record tracks in arcuate paths; and, the electrical conductors are in fixed positions around the arcuate paths.

10. A device for determining the degree of coherence between first and second signals magnetically recorded on first and second magnetic record tracks as defined in claim 9 wherein:

the support means for positioning the first and second record tracks comprises a drum for supporting each record track, the drums being journaled for independent rotation whereby the first and second record tracks can be moved past the fixed electrical conductors at velocities to establish relative motion between the first and second tracks.

11. A device for determining the degree of coherence between first and second signals magnetically recorded on first and second magnetic record tracks, the device comprising:

a cylindrical member journaled for rotation about an axis of rotation;

means for rotating the cylindrical member;

a plurality of electrical conductors connected to the cylindrical member, the electrical conductors being disposed parallel to the axis of rotation and in a common surface of revolution about the axis of rotation, and being circumferentally spaced around the periphery of the cylindrical member;

support means for positioning the first and second record tracks adjacent to at least an arcuate segment of the surface of revolution of the conductors such that the magnetic fields of the first and second record tracks will be intersected by the conductors as the cylindrical member is rotated; and, circuit means for adding the absolute values of the electromotive forces generated in all of the electrical conductors to produce a correlation signal representative of the degree of coherence between two finite time periods of the first and second signals.

12. A device for determining the degree of coherence between first and second signals magnetically recorded on first and second magnetic record tracks as defined in claim 11 further characterized by:

means for moving the first record track relative to the arcuate path at a first velocity; and, means for moving the second record track relative to the arcuate path at a second velocity, whereby studies as to the degree of coherence between the first and second signals under various time relationships can be made.

13. A device for determining the degree of coherence between first and second signals magnitically recorded on first and second magnetic record tracks as defined in claim 12 wherein:

the support means for positioning the first and second record tracks comprises two relatively thin walled drums disposed around the cylindrical member and independently journaled for rotation, whereby the first and second record tracks can be freely moved at different speeds relative to the cylindrical member and the cylindrical member can be rotated at a high speed without the record tracks rubbing on the surface of the cylindrical member.

References Cited

UNITED STATES PATENTS

| | | | |
|---|---|---|---|
| 2,243,730 | 5/1941 | Ellis | 235—181 X |
| 2,800,639 | 7/1957 | Lee | 235—181 X |
| 3,065,453 | 11/1962 | Doty | 340—15.5 |
| 3,163,750 | 12/1964 | Lindsey et al. | 235—181 |
| 3,174,142 | 3/1965 | Mallinckrodt | 235—181 X |
| 3,209,134 | 9/1965 | Feagin et al. | 235—181 |
| 3,209,322 | 9/1965 | Doty | 340—15.5 |
| 3,223,967 | 12/1965 | Lash | 340—15.5 |

MALCOLM A. MORRISON, *Primary Examiner.*

I. KESCHNER, J. F. RUGGIERO, *Assistant Examiners.*